US010034426B2

(12) United States Patent
Treffer et al.

(10) Patent No.: US 10,034,426 B2
(45) Date of Patent: Jul. 31, 2018

(54) METHOD OF ADJUSTING THE DISCHARGE ANGLE OF A CROP CONVEYOR DECK

(71) Applicant: AGCO Corporation, Duluth, GA (US)

(72) Inventors: Douglas R. Treffer, Hesston, KS (US); Daniel S. Jost, Hesston, KS (US); Shane A. Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/647,357

(22) Filed: Jul. 12, 2017

(65) Prior Publication Data

US 2017/0318744 A1 Nov. 9, 2017

Related U.S. Application Data

(62) Division of application No. 15/132,847, filed on Apr. 19, 2016, now Pat. No. 9,736,983.

(51) Int. Cl.
*A01D 43/00* (2006.01)
*A01D 43/04* (2006.01)

(52) U.S. Cl.
CPC .................................. *A01D 43/04* (2013.01)

(58) Field of Classification Search
CPC ........ A01D 57/20; A01D 84/00; A01D 57/00; A01D 43/00; A01D 43/06; A01D 57/30; Y10S 56/21; A01B 73/005
USPC ......................................................... 56/192
See application file for complete search history.

(56) References Cited

U.S. PATENT DOCUMENTS

| | | | | |
|---|---|---|---|---|
| 2,667,731 A | * | 2/1954 | Harold | A01D 57/30 56/13.5 |
| 3,214,002 A | * | 10/1965 | Kirkpatrick | A01D 57/20 198/369.7 |
| 4,022,005 A | * | 5/1977 | Case | A01D 57/28 56/372 |
| 4,429,517 A | * | 2/1984 | Lohrentz | A01D 57/20 198/314 |
| 4,590,751 A | * | 5/1986 | Stephenson | A01D 57/20 56/181 |
| 4,738,092 A | * | 4/1988 | Jennings | A01D 57/20 56/366 |
| 4,934,131 A | * | 6/1990 | Frisk | A01L 373/005 56/15.5 |
| 5,031,393 A | * | 7/1991 | Rostoucher | A01D 57/20 198/312 |
| 5,203,154 A | * | 4/1993 | Lesher | A01D 57/12 56/366 |

(Continued)

*Primary Examiner* — Arpad Fabian-Kovacs

(57) ABSTRACT

A windrower with a header has a conveying medium with first and second portions connected with a pivot joint and moveable across a plurality of rollers configured to receive crop material from the header and direct the crop material to a side of the windrower to form a windrow on the ground to the side of the windrower. In an operational position and with the frame selected to one of the predetermined angular adjustments, the conveying medium discharges the harvested crop material at an angle of trajectory determined by the selected angular positon of the second portion. The windrower harvests crop with the header, receives the mowed crop on the conveyor system, adjusts a rate at which the mowed crop is discharged from the conveyor system, and adjusts an angle of trajectory at which the mowed crop is discharged from the conveyor system.

3 Claims, 9 Drawing Sheets

(56) References Cited

U.S. PATENT DOCUMENTS

| | | | | |
|---|---|---|---|---|
| 5,231,826 | A * | 8/1993 | Jennings | A01D 57/20 56/10.9 |
| 5,272,860 | A * | 12/1993 | Baril | A01D 57/20 56/10.7 |
| 5,351,468 | A * | 10/1994 | Pominville | A01D 57/20 56/192 |
| 6,145,289 | A * | 11/2000 | Welsch | A01D 57/20 56/13.6 |
| 6,164,051 | A * | 12/2000 | van der Lely | A01D 57/20 56/367 |
| 6,205,757 | B1 * | 3/2001 | Dow | A01D 57/20 56/366 |
| 6,415,590 | B1 * | 7/2002 | Lohrentz | A01D 57/20 56/14.9 |
| 6,679,038 | B2 * | 1/2004 | Walch | A01D 57/20 56/16.4 R |
| 6,715,274 | B2 * | 4/2004 | Peeters | A01D 84/00 56/366 |
| 6,832,467 | B2 * | 12/2004 | Franet | A01D 57/20 56/192 |
| 6,907,719 | B2 * | 6/2005 | Ligouy | A01B 73/005 56/15.1 |
| 7,028,459 | B2 * | 4/2006 | Lohrentz | A01D 57/20 56/192 |
| 7,526,908 | B1 * | 5/2009 | Rice | A01D 57/00 56/192 |
| 7,574,851 | B1 * | 8/2009 | McLean | A01D 57/24 56/192 |
| 7,743,594 | B1 * | 6/2010 | Wanner | A01D 34/82 172/132 |
| 7,766,158 | B2 * | 8/2010 | Laganiere | A01D 57/20 198/312 |
| 8,353,377 | B2 * | 1/2013 | Geiger | B60B 35/10 180/209 |
| 8,833,044 | B2 * | 9/2014 | Hoffman | A01D 43/06 56/10.6 |
| 2007/0068131 | A1 * | 3/2007 | Talbot | A01D 57/20 56/192 |
| 2009/0139196 | A1 * | 6/2009 | McLean | A01D 84/00 56/14.7 |

* cited by examiner

METHOD OF ADJUSTING THE DISCHARGE ANGLE OF A CROP CONVEYOR DECK

CROSS REFERENCE TO RELATED APPLICATION

This application is a divisional application of U.S. application Ser. No. 15/132,847, filed Apr. 19, 2016, now U.S. Pat. No. 9,736,983, which claims the benefit of U.S. Provisional Application No. 62/150,928 filed Apr. 22, 2015, which is hereby incorporated by reference in its entirety.

BACKGROUND OF THE INVENTION

Field of Invention

The present disclosure is generally related to agricultural equipment and, more particularly, is related to crop discharge mechanisms of a windrower.

Description of Related Art

Traditional crop conveyors (e.g., double or triple windrow attachments and/or mergers) rely on the speed of their belt to control the placement of the conveyed crop. While this method is widely accepted, it is by no means ideal. While belt speed may control the placement of the crop, it may also have an effect on windrow formation and crop orientation, which are equally as important as they affect how well the crop can then be fed into a forage harvester or baler.

BRIEF SUMMARY OF THE INVENTION

Briefly stated, one aspect of the invention is directed to a windrower a windrower having mechanism for harvesting crop material from a field and for discharging the harvested crop material as the windrower advances along a field. The windrower has a chassis and a header coupled to the chassis and located at a front of the windrower to harvest crop material as the windrower advances along a field and discharge the harvested crop in a rearwardly directed stream. The windrower has a crop conveyor system including a frame coupled to the chassis. The frame has a first portion and a second portion and a pivot joint that enables plural angular adjustments, within a predetermined range of angular adjustments, between the first and second portions such that a distal end of the second portion is positioned at a higher elevation relative the field than an elevation of a proximal end of the second portion adjacent the pivot joint. The crop conveyor system has plural rollers coupled to the frame, and a conveying medium moveable across the plural rollers when the first and second portions are oriented at any of the plurality of angles relative to each other within the predetermined range and configured to receive crop material from the header and direct the crop material to a side of the windrower to form a windrow on the ground to the side of the windrower. The frame is mounted for adjusting movement between an operational, lowered position in which the crop material is directed onto the conveying medium and a non-operational, raised position in which the stream of crop material is directed onto the ground away from the conveying medium. When in the operational position and with the frame selected to one of the predetermined angular adjustments, the conveying medium discharges the harvested crop material at an angle of trajectory determined by the selected angular position of the second portion.

Another aspect of the invention is a method of operating a windrower with a header coupled thereto. The method includes mowing crop with a header configured to harvest crop material as the windrower advances along a field and discharge the harvested crop in a rearwardly directed stream. The method includes receiving the mowed crop on a conveyor system having a frame coupled to a chassis of the windrower and a moving conveying medium and moving the frame relative the chassis between a non-operational, raised position in which the stream of crop material is directed onto the ground under the conveying medium and an operational, lowered position to direct the crop material to a side of the windrower to form a windrow on the ground to the side of the windrower. The method also includes adjusting an angle of trajectory at which the mowed crop is discharged from the conveyor system such that a first section of the conveying medium is oriented at an angle different than a second section of the conveying medium, wherein in the operational position and with the frame selected to one of the predetermined angular adjustments, the conveying medium discharges the harvested crop material at an angle of trajectory determined by the selected angular position of the second portion.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Figure 1:
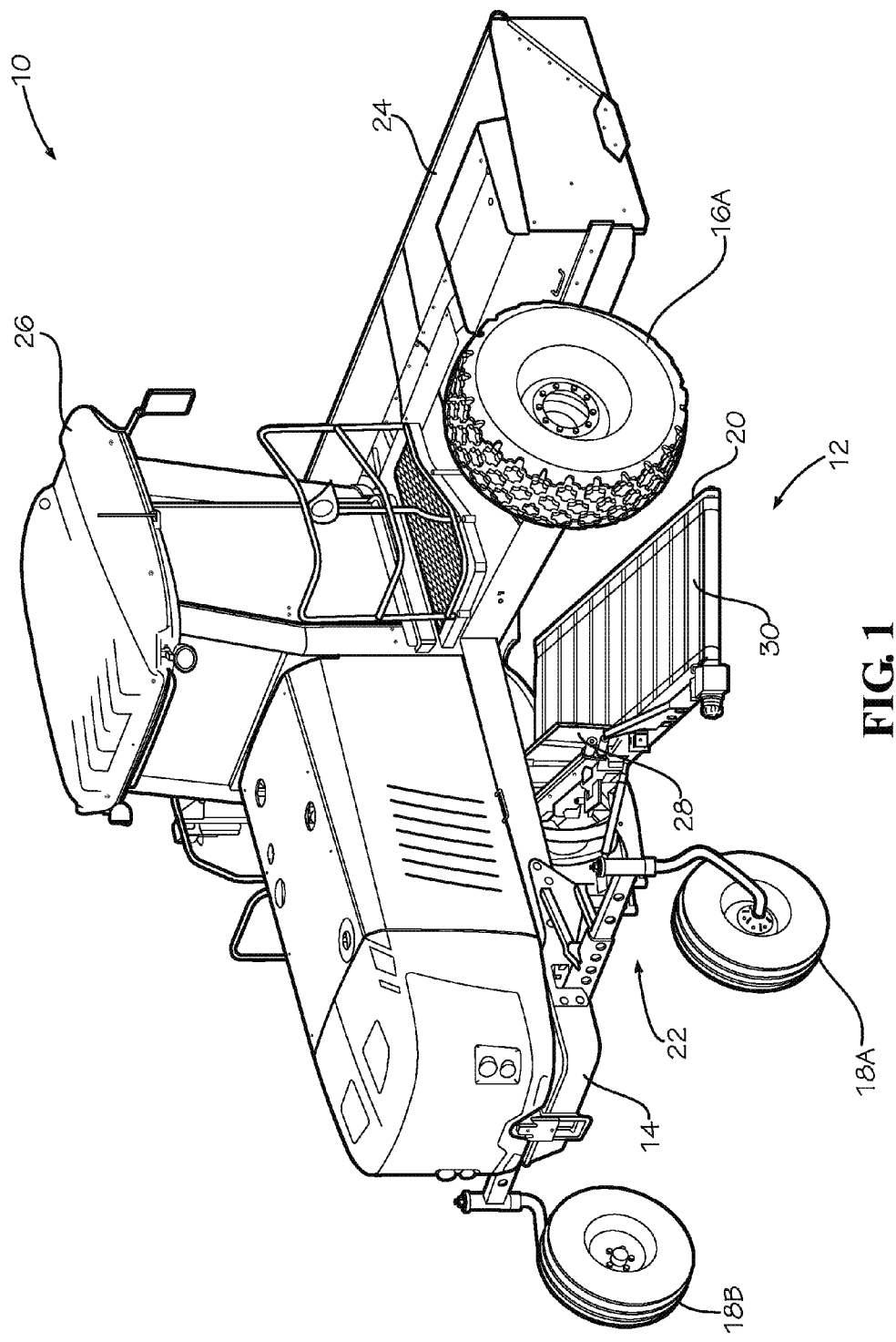
FIG. 1 is a schematic diagram that illustrates, in rear-isometric view, an example windrower equipped with an embodiment of an example crop conveyor system.

Certain embodiments of a crop conveyor system and method for an agricultural machine, such as a windrower, are disclosed that provide a mechanism to adjust a pitch or crop-conveying trajectory of a conveying medium (e.g., endless belt). In one embodiment, the pitch adjustment is accomplished by adding a pivot joint (or equivalently, a pivot member) in a conveyor frame (or equivalently, conveyor deck). The pivot joint enables a first portion of the frame to remain in a traditional or conventional position and/or orientation, enabling mowed crop to be thrown onto the conveyor from a header coupled to the front of the windrower without any (or without any significant) impediment. As the mowed crop is moved by the conveying medium toward a discharge end of the conveyor, the pitch of the second (extended) or pivoting portion of the frame may be adjusted (e.g., inclined, such as relative to the first portion) to change an angle of trajectory of the mowed crop from the conveyor system. In one embodiment, the amount of angular adjustment may take the form of a plurality of different angular adjustments within a predetermined range of angular adjustments, whether continuously variable or incremental (discrete). The pivoting (angular adjustment) of the discharge portion of the frame relative to the first portion enables better control of crop placement without affecting windrow formation and/or crop orientation.

Digressing briefly, traditional crop conveyors (e.g., double windrow attachments) use a couple of different methods to affect crop conveyance. In one method, a fixed-angle extension is mounted to the conveyor frame, the fixed angle extension comprising a separate frame and drive system (e.g., separate from the portion to which the extension is added to). To control the discharge of the mowed crop, operators adjust a secondary shield that interferes with the discharged, mowed crop, thus altering its placement. Another mechanism to control placement of the discharged, mowed crop from a fixed-angle extension is to vary the belt/roller speed. A second method is to simply make the traditional conveyor deck longer and control the mowed crop placement with the speed of the belt. However, one perceived shortcoming to such an approach is that windrows formed by this type of conveyor system are typically not uniform in size or shape. Additionally, the mowed crop tends to become more tangled, making it more difficult to feed into a forage harvester or baler. These issues become more prevalent as the width of the headers increase. In contrast, certain embodiments of crop conveyor systems eliminate the need for secondary systems while providing uniform windrows, simplifying the installation process and reducing costs. Certain embodiments of crop conveyor systems use a combination of the changes in belt speed and angular adjustment, which enables a more tailored handling of conventional loads as well as a more robust handling of the increased loads expected with headers of increased width.

Having summarized certain features of a crop conveyor system of the present disclosure, reference will now be made in detail to the description of the disclosure as illustrated in the drawings. While the disclosure is described in connection with these drawings, there is no intent to limit it to the embodiment or embodiments disclosed herein. For instance, although emphasis is placed on agricultural machines or vehicles such as a windrower, it should be appreciated that other machines or vehicles from the same or other industries that perform crop or material conveyance may similarly benefit from the systems and/or methods of the disclosed embodiments, and hence are contemplated to be within the scope of the disclosure. Further, although emphasis is placed on a single conveying medium using a single frame, such as an endless belt, it should be appreciated that a conveying medium embodied as slats, chains, or plural belts operative with a single or multiple frames may be used in some embodiments. For instance, in some embodiments, two frames may be used, each using a respective conveying medium (e.g., belt) with an associated drive to cause movement of the respective belt, wherein the second frame may be pivotably adjusted for operational use. Further, although the description identifies or describes specifics of one or more embodiments, such specifics are not necessarily part of every embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly.

FIG. 1 is a schematic diagram that illustrates, in rear-isometric view, an example windrower 10 equipped with an embodiment of an example crop conveyor system 12. One having ordinary skill in the art should appreciate in the context of the present disclosure that the example windrower 10 is merely illustrative, and that other vehicles and/or configurations and arrangement of components may be used in some embodiments. The windrower 10 comprises a chassis 14, to which are coupled a pair of front wheels 16 (e.g., 16A, the other front wheel obscured from view in FIG. 1) and a pair of rear wheels 18 (e.g., 18A, 18B). In some embodiments, other axle and/or wheel arrangements involving fewer or additional quantities of wheels, and/or different mechanisms of ground transport (e.g., tracks), may be used. In one embodiment, the crop conveyor system 12 comprises a frame 20 that is moveably coupled to the chassis 14. The frame 20 is moved (e.g., raised and lowered, rotated) according to a well-known structural assembly 22 that couples the frame 20 to the chassis 14. As the features and function of the structural assembly 22 are well-known in the agricultural equipment industry, further discussion of the same is omitted here for brevity. Also coupled to the chassis 14 are a header 24 and a cab 26. The header 24 is located at the front of the windrower 10, and is used to mow and/or condition crop as the windrower 10 advances along a field. The header 24 discharges the mowed crop rearward toward the frame 20 or between the front wheels 16 depending on the implementation and the position of the frame 20. The header 24 may be detachably coupled to the chassis 14, and may be embodied as one of a variety of widths as is known. An operator may control operations of the windrower 10 from within the cab 26, or in some embodiments, remotely.

Coupled to one side (rear side, such as from the perspective of when the frame 20 is at or approximately at the final mowed crop discharge orientation) of the frame 20 is a substantially upstanding panel or panels 28. Assuming an elongated single panel for purposes of discussion as one embodiment, the panel 28 serves at least the function of blocking the mowed crop that is discharged rearward from the header 24 of the windrower 10, enabling deposit of the mowed crop onto the crop conveyor system 12. Moveable circuitously within the frame 20 is a conveying medium 30 that receives the mowed crop discharged from the header 24 (and blocked, at least in part, by the panel 28). In one embodiment, the conveying medium 30 comprises an endless, elastomeric belt, though in some embodiments, additional belts and/or other materials or types of conveying mediums (e.g., slats, chains, etc.) may be used. The frame 20 comprises plural rollers (obscured from view by the conveying medium 30) over which the conveying medium 30 circuitously travels.

Figure 2:
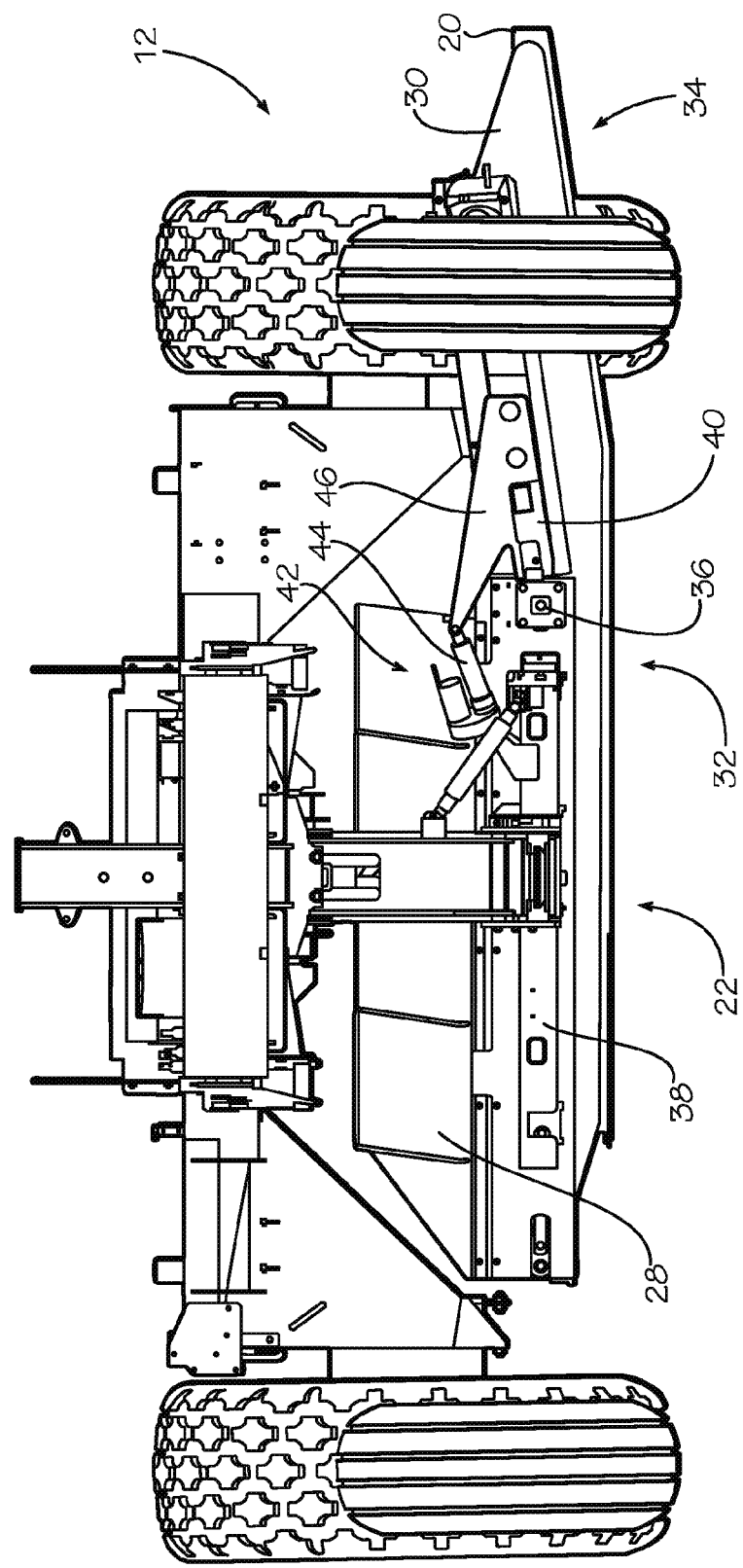
FIG. 2 is a schematic diagram that illustrates, in fragmentary, rear elevation view, an example windrower equipped with an embodiment of an example crop conveyor system configured in a lowered position.

FIG. 2 is a schematic diagram that illustrates, in fragmentary, rear elevation view, the crop conveyor system 12 of FIG. 1 configured in the lowered position. As evident in FIG. 2, the frame 20 comprises a first portion 32 and a second portion 34. The second portion 34 serves as an extended portion to the first portion 32, the first portion 32 functioning conventionally to receive the mowed crop from the header 24 (FIG. 1). Note that the structural assembly 22 is secured to the frame 20 on the rearward side proximal to the first portion 32. The second portion 34 is shown at an adjusted nonzero angle relative to the first portion 32. The second portion 34 may be adjustably positioned (e.g., manually, or via control of an actuable device) to one of a plurality of angular positions within a predetermined range relative to the first portion 32. In one embodiment, the range may be from zero (0) to ten (10) degrees. In some embodiments, the range may be from zero (0) to twenty (20) degrees. In some embodiments, other ranges may be used. The adjustment may be a continuously variable adjustment in some embodiments, and/or in some embodiments, the adjustment may be incremental (e.g., in predetermined, discrete or incremental movements or steps). Further, though described in the context of a second portion 34 that pivots relative to the first portion 32, in some embodiments, the first portion 32 may also pivot relative to the second portion 34. The angular adjustment is achieved around a pivot joint 36. Also shown in FIG. 2 are frame brackets 38 and 40. The frame bracket 38 is secured to one side (rear side in FIG. 2) of the frame 20, within the first portion 32. Coupled to the frame bracket 38 is an actuable device assembly 42, which includes an actuable device 44 (e.g., hydraulic cylinder, electric rotary actuator, etc.). The frame bracket 40 is secured to the rear side (in FIG. 2) of the frame 20 within the second portion 34. The frame bracket 40 (and hence the second portion 34 of the frame 20) is pivotably coupled to the pivot joint 36. The frame bracket 40 is further coupled to an angular bracket 46 at a location beyond (above) the top of the sides of the frame 20. The angular bracket 46 in turn is moveably coupled to the actuable device 44. That is, through extension and retraction of the piston/rod assembly of the actuable device 44, the second portion 34 is lowered or raised to a desired angular position relative to the first portion 32. The conveying medium 30 is operational (e.g., moves in a circuitous manner), regardless of the relative angular position of the second portion 34, throughout the predetermined range of angular positions. Note that, in one embodiment, the discharge end of the second portion 34 extends (e.g., approximately twenty (20) inches) beyond the right hand side of the front wheelbase, which (the end of the extension) is proximal to one end (e.g., the right hand side end) of a thirteen (13) foot wide header. In some embodiments, the width of the header 24 may be shorter or longer using the same configuration and size frame 20 for the crop conveyor system 12 (e.g., and hence the same dimensional extension past the front wheelbase), or in some embodiments, the frame 20 of the crop conveyor system 12 of a different size and/or orientation (e.g., and hence a different dimensional extension past the front wheelbase) may be used.

Figure 3:
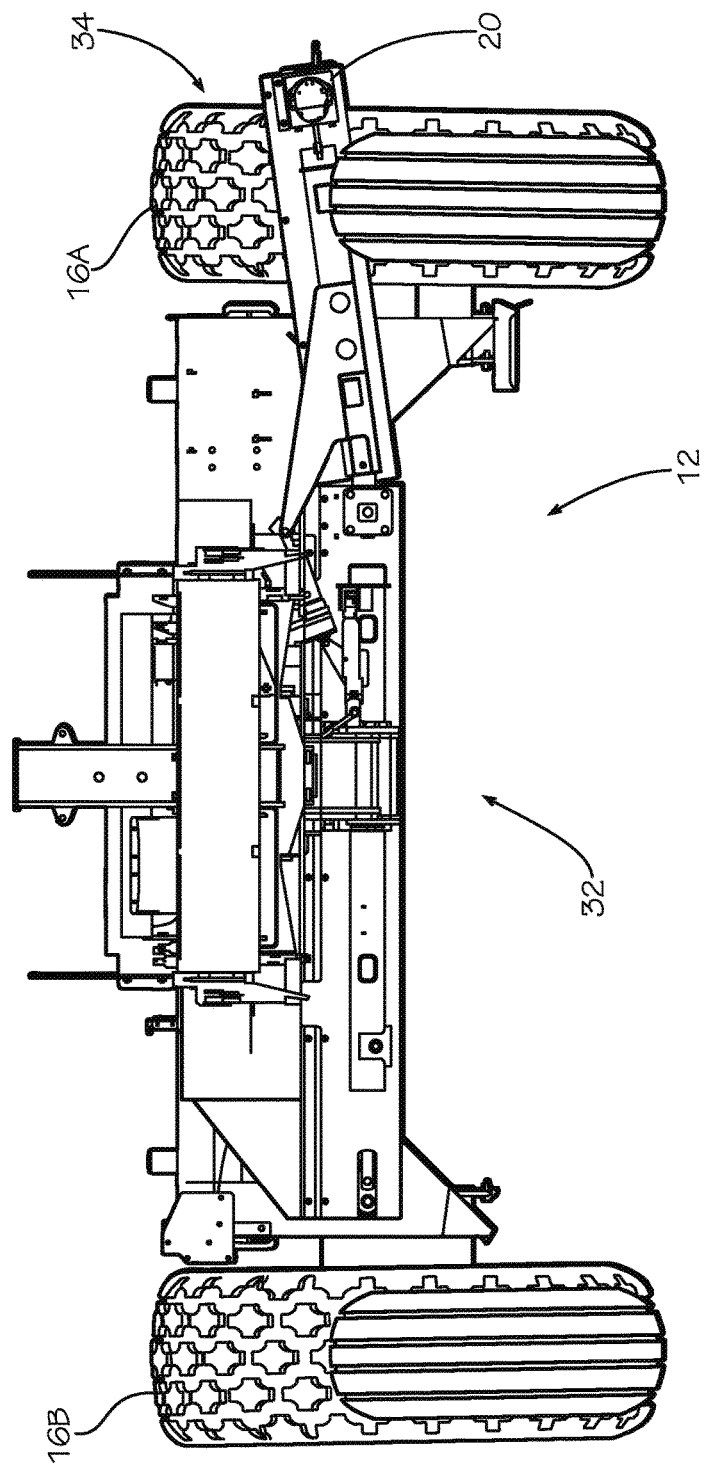
FIG. 3 is a schematic diagram that illustrates, in fragmentary, rear elevation view, an example windrower equipped with an embodiment of an example crop conveyor system configured in a raised position.

Referring now to FIG. 3, shown is the crop conveyor system 12 configured in a raised position. Similar to that shown in FIG. 2, the second portion 34 of the frame 20 is oriented in a non-zero angular position relative to the first portion 32. In one example windrower operation, during one pass across the field by the windrower 10 (FIG. 1), the crop conveyor system 12 is oriented in the raised position, such as prompted by operator manipulation of controls/user interface in the cab 26 (FIG. 1) of the windrower 10 (or in some embodiments, automatically positioned based on detected position coordinates or remotely actuated). With the crop conveyor system 12 in the raised position, the windrower 10 discharges mowed crop onto the field in between the front wheels 16 (e.g., 16A and 16B). Upon reaching a point where the operator of the windrower 10 seeks to turn the windrower 10 around, the operator activates (or in some embodiments, the activation is automatic based on the detected coordinate position and/or heading) the crop conveyor system 12. The crop conveyor system 12, using the well known structure 22, is lowered (FIG. 2) in known manner. In some embodiments, the angular position of the second portion 34 (relative to the first portion 32) may be adjusted before operations in the field begins or in real time (e.g., via a control signal prompted by operator input entered at a user interface in the cab 26 or remotely). Shown in FIG. 2 in the non-zero angular position, the crop conveyor system 12 receives the mowed crop (discharged onto the first portion 32 with or without the aid of the panel 28, FIG. 2), and through movement of the conveying medium 30, causes the discharge, with a loft or angle of trajectory determined by the angular position of the second portion 34 relative to the first portion 32, of the mowed crop onto the prior-deposited windrow (i.e., from the prior pass).

Figure 4:
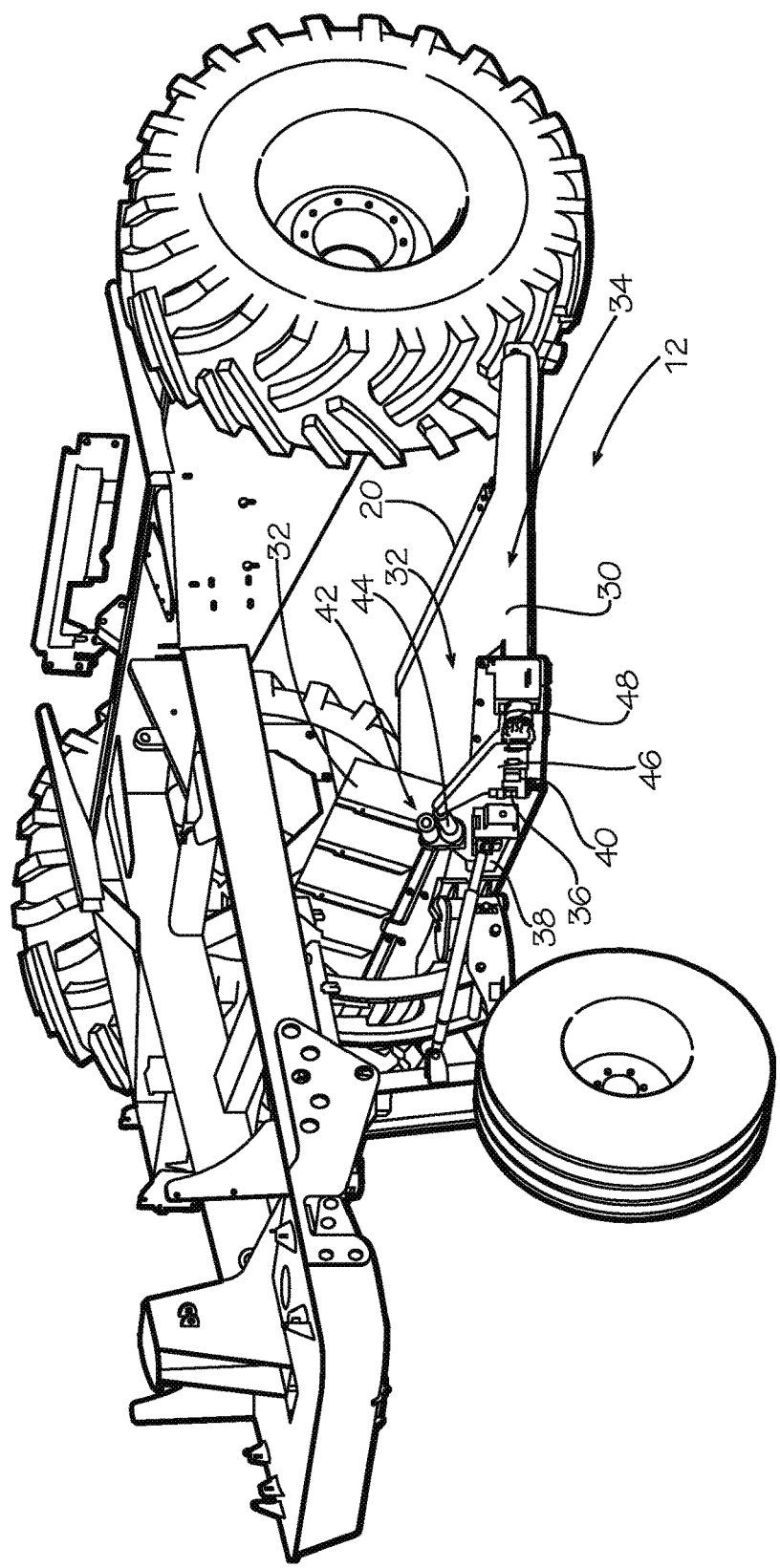
FIG. 4 is a schematic diagram that illustrates, in a close-up, rear isometric view, an embodiment of an example crop conveyor system configured in a non-zero angled crop discharge position.

Attention is now directed to FIG. 4, which is a schematic diagram that illustrates, in a close-up, rear isometric view, the crop conveyor system 12 configured in a non-zero angled crop discharge position. As noted, the crop conveyor system 12 comprises the frame 20 having the first portion 32 and the extended or second portion 34, with the panel 28 located on the rear side of the frame 20 in FIG. 4 within or proximal to the first portion 32. The conveying medium 30 moves circuitously within the frame 20 (e.g., in a clock-wise direction when viewed from the rear of the windrower 10 (FIG. 1) to discharge mowed crop to the side of the windrower 10. As is known, the rate of discharge of the mowed crop (or equivalently, the speed of the conveying medium 30) may be adjusted to enable the mowed crop to be thrown a desired distance, such as based on the header length, the condition of the mowed crop, the type of mowed crop, among other parameters. Additionally, the angular position of the second portion 34 relative to the first portion 32 is adjusted (manually or via remote control or control from the cab) based on similar parameters used to determine the speed of the conveying medium 30. Shown on the rear side of the frame 20 of the crop conveyor system 12 (e.g., to the left of the pivot joint 36 in FIG. 4) is the frame bracket 38, to which is coupled the actuable device assembly 42 that includes the actuable device 44. The frame bracket 40 is coupled to the pivot joint 36, and is further coupled to the angular bracket 46 to the right (in FIG. 4) of the pivot joint 36. The angular bracket 46 is coupled (e.g., at a location above the top sides of the frame 20) to the actuable device 44 to enable angular adjustment of the second portion 34 relative to the first portion 32. Also shown is an actuable device (e.g., motor) 48 located in one embodiment, on the rear side of the frame 20, proximal to the discharge end of the second portion 34. The motor 48 is coupled to a drive roller (obscured by the conveying medium 30), which drives the circuitous movement of the conveying medium 30 over plural rollers coupled to the frame 20 and sandwiched between opposing direction sides of the conveying medium 30. The motor 48 may be a hydraulic motor, or in some embodiments, operable according to other motive forces (e.g., electric, pneumatic, etc.) and controlled in one embodiment by an actuable device control (e.g., an actuator or switch that receives control signals from a controller).

Figure 5A:
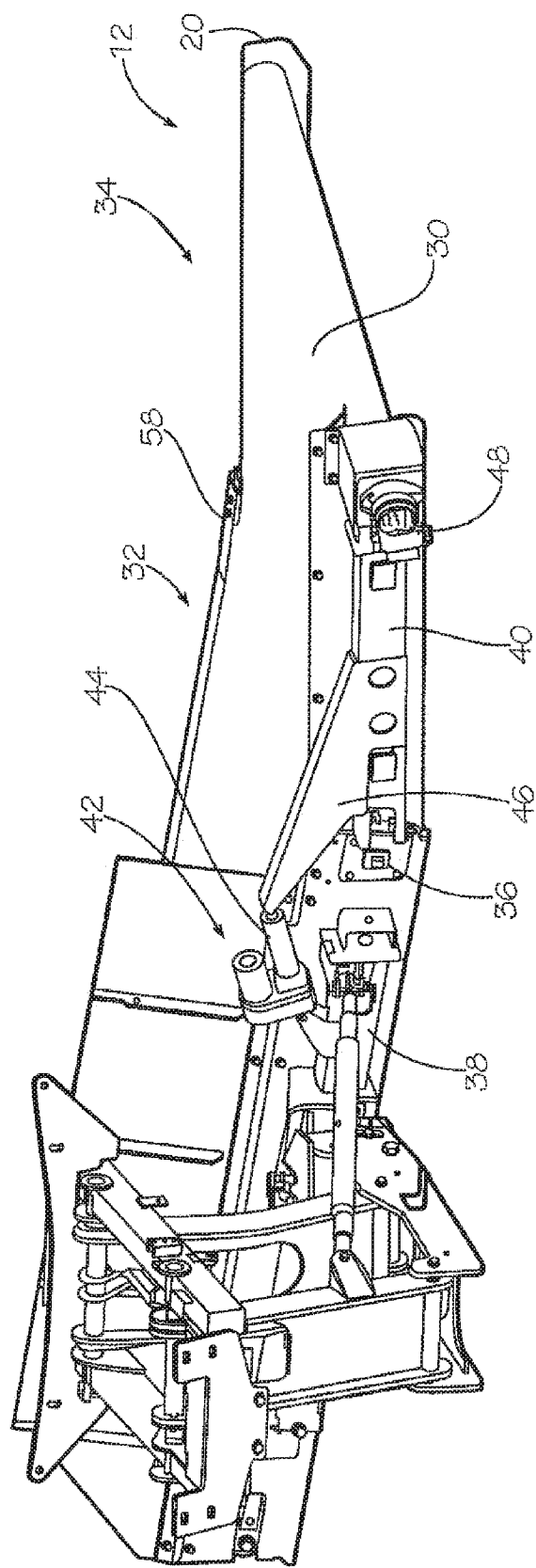
FIG. 5A is a schematic diagram that illustrates, in a close-up, side isometric view, an embodiment of an example crop conveyor system configured in a non-zero angled crop discharge position.
Figure 5B:
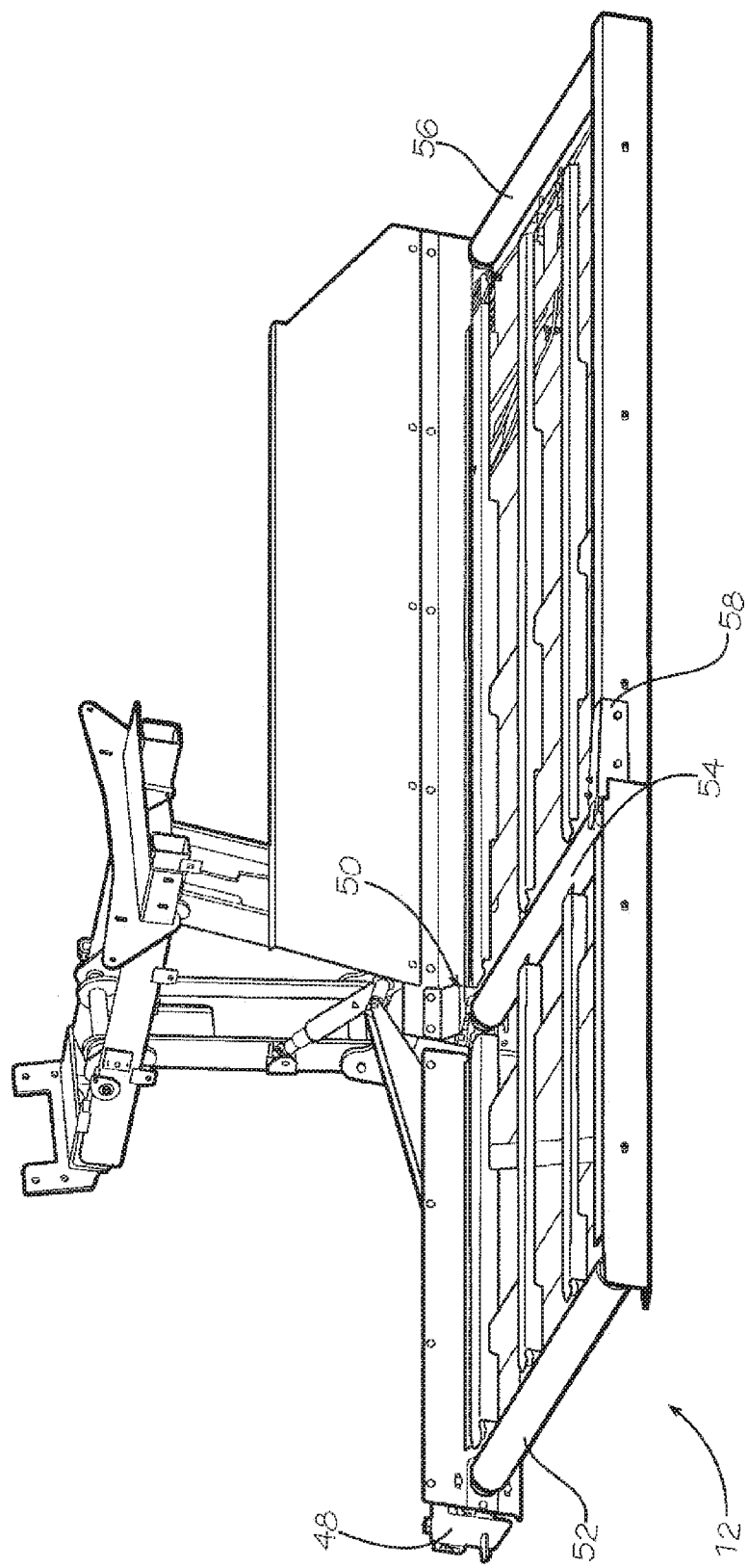
FIG. 5B is a schematic diagram that illustrates, from a front, isometric perspective, the plural rollers of a frame of an example crop conveyor system configured in a zero angled crop discharge position.

FIG. 5A is a schematic diagram that further illustrates, in a close-up, side isometric view, the crop conveyor system 12. Once again, the crop conveyor system 12 is shown in a non-zero angled discharge configuration. Shown is the conveying medium 30 that moves within the frame 20. The pivot joint 36 is shown, as well as the frame bracket 40 that is pivotably coupled to the pivot joint 36 (via a bolt, or in some embodiments, other pivotably securing mechanisms) and also secured to the rear side of the frame 20, enabling the second portion 34 to pivot to an angular position relative to the first portion 32. In one embodiment, and referring collectively to FIGS. 5A and 5B (and noting that FIG. 5B pertains to a zero-angled position, whereas FIG. 5A pertains to a non-zero angled position), the pivot joint 36 comprises a roller assembly 50 that is secured in position by bolts (one shown) inserted through each side of the frame 20 and partially within the roller assembly 50 at the pivot joint location. The frame bracket 40 is further coupled to an angular bracket 46 that extends above the top sides of the frame 20. The frame bracket 38 associated with the first portion 32 and attached to the rear side of the frame 20 is coupled to the actuable device assembly 42, which includes the actuable device 44. The actuable device 44 is coupled to the angular bracket 46, enabling along with the pivot joint 36, the angular adjustment of the second portion 34 relative to the first portion 32. Also coupled to the frame 20 (e.g., rear side of the frame, though not limited to this location) is the motor 48 which drives an underlying drive roller 52 to cause circuitous movement of the conveying medium 30 across plural rollers 54, 56. Note that the underlying framework of the crop conveyor system 12 shown in FIG. 5B is illustrative, and that other configurations, including different quantities of rollers, may be used and hence are contemplated to be within the scope of the disclosure. Also shown is a guide member 58, which may be used singly or in conjunction with an opposing guide member located transversely to the guide member 58 proximal to the rear side of the frame 20, hinders movement of the conveying medium 30, in a location adjacent to the transverse line across the conveying medium 30 coinciding with the pivot joint 36 and roller assembly 50, and in a direction perpendicular to the top surface of the conveying medium 30. In other words, the guide member(s) 58 ensure the conveying medium 30 rides across the underlying roller 54 in the area of the joint between the first and second portions 32 and 34. In one embodiment, the guide member(s) 58 achieve this function by partially overlapping an edge of the top surface of the conveying medium 30.

Figure 6:
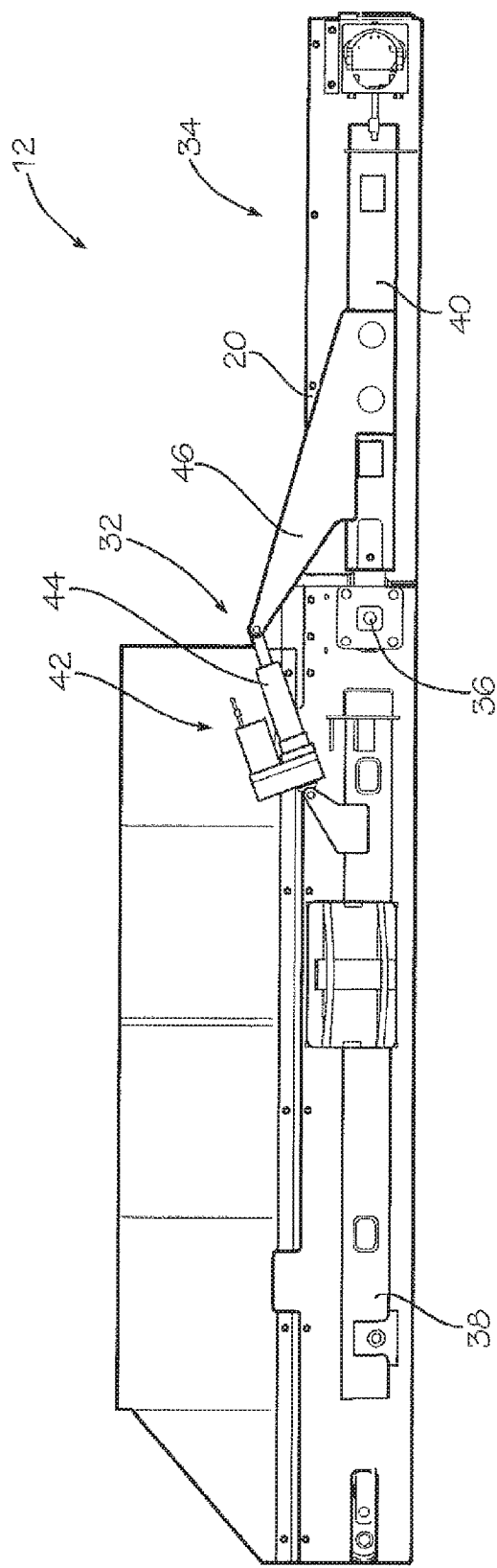
FIG. 6 is a schematic diagram that illustrates, in side elevation view, an embodiment of an example crop conveyor system configured in a zero angled crop discharge position.

FIG. 6 is a schematic diagram that illustrates, in side elevation view, the crop conveyor system 12 configured in a zero angled crop discharge position. In other words, the second portion 34 of the frame 20 is oriented at a zero angle relative to the first portion 32 (e.g., they are in-line with each other). This zero-angle configuration is achieved, at least in part, through angular rotation about the pivot joint 36, to which the frame bracket 40 is pivotably coupled. The angular bracket 46 coupled on one end to the frame bracket 40 is also coupled on the opposing end (of the angular bracket 46) to the actuable device 44 that is included within the actuable device assembly 42. The actuable device assembly 42 is coupled to the frame bracket 38, as described previously. In one example operation, when the actuable device 44 is extended (e.g., a rod is extended by virtue of fluid flow/area change adjacent the piston within the hydraulic cylinder), the extending rod pushes the angular bracket 46 in a clockwise (e.g., when viewed in FIG. 6) rotation, which causes the second portion 34 of the frame 20 to likewise rotate clockwise about the pivot joint 36 to a zero-angled position of the second portion 34 relative to the first portion 32.

Figure 7:
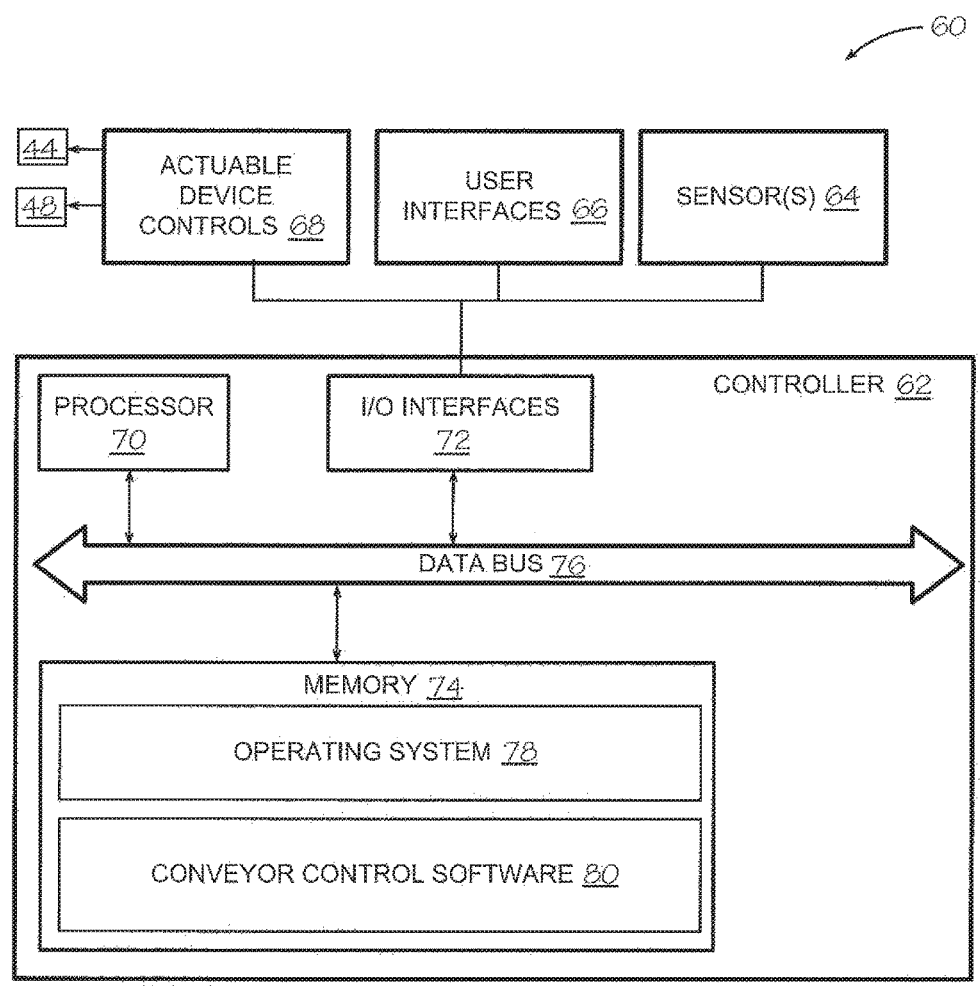
FIG. 7 is a block diagram that illustrates an embodiment of an example control system for a crop conveyor system.

Having described the overall structure and functionality of an embodiment of a crop conveyor system 12, attention is now directed to FIG. 7 (with continued reference to FIGS. 1-6), which shows an embodiment of an example control system 60 that may be used to control operations of the crop conveyor system 12. In one embodiment, the control system 60 comprises a controller 62 (e.g., an electronic control unit or ECU) coupled to one or more sensors 64, user interfaces 66, and actuable device controls 68. In some embodiments, additional controllers may be used. In one embodiment, the actuable device controls 68 (or equivalently, actuators) are each respectively coupled to one or more actuable devices, such as actuable devices 44 and 48 (motor 48). In some embodiments, the actuable device controls 68 may be embodied as one or more devices that are more rudimentary in operation, such as switches (e.g., relays, and/or contactors). Operation of the actuable devices 44 and 48 may be based on any one or combination of hydraulic, electric, mechanical, magnetic, pneumatic motive forces. In some embodiments, one or more of the sensors 64 may be located proximal to components of the actuable devices 44 and 48. One having ordinary skill in the art should appreciate in the context of the present disclosure that the example controller 62 is merely illustrative, and that some embodiments of controllers may comprise fewer or additional components, and/or some of the functionality associated with the various components depicted in FIG. 7 may be combined, or further distributed among additional modules or controllers, in some embodiments. Further, it should be appreciated that, though described in the context of residing in a single controller 62, functionality of the controller 62 may be distributed among a plurality of controllers in some embodiments, and in some embodiments, one or more of the functionality of the controller 62 may be achieved remote from the windrower 10 (e.g., FIG. 1, where the windrower 10 has telecommunications and/or internet connectivity functionality). The controller 62 is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 62. In one embodiment, the controller 62 comprises one or more processors, such as processor 70, input/output (I/O) interface(s) 72, and memory 74, all coupled to one or more data busses, such as data bus 76. The memory 74 may include any one or a combination of volatile memory elements (e.g., random-access memory RAM, such as DRAM, and SRAM, etc.) and nonvolatile memory elements (e.g., ROM, hard drive, tape, CDROM, etc.). The memory 74 may store a native operating system, one or more native applications, emulation systems, or emulated applications for any of a variety of operating systems and/or emulated hardware platforms, emulated operating systems, etc.

In the embodiment depicted in FIG. 7, the memory 74 comprises an operating system 78 and conveyor control software 80. It should be appreciated that in some embodiments, additional or fewer software modules (e.g., combined functionality) may be deployed in the memory 74 or additional memory (or in different devices). In some embodiments, a separate storage device may be coupled to the data bus 76, such as a persistent memory (e.g., optical, magnetic, and/or semiconductor memory and associated drives). The storage device may be a removable device, such as a memory stick or disc.

In one embodiment, the conveyor control software 80 is executed by the processor 70 to receive user input at the user interfaces 66 (e.g., one or a combination of console button, switch, knob, hydro handle or joystick, scroll wheel, display screen with selectable icon displayed on the screen that is manipulated by a mouse or joystick, display screen embodied with selectable icons on a touch-type screen, microphone on a headset or on the console, etc.), match or associate (e.g., via look-up table or in some embodiments via programmed switch position activation) the input with a corresponding conveyor function (e.g., adjust an angular position between the first and second portions 32, 34 of the frame 20 of the crop conveyor system 12, drive and/or adjust the speed of the drive rollers 52 via the motor 48, etc.), and actuate one or more actuable device controls 68, which in turn causes the actuable devices 44 and/or 48, among possibly others to be activated accordingly (e.g., adjust the angular position of the second portion 34 relative to the first portion 32, and/or activate the motor 48 to drive the drive roller 52, etc.). As to the actuable device controls 68, where the actuable device 44 is embodied as a hydraulic cylinder, in one embodiment, the actuable device controls 68 may include a control valve that comprises an actuator (e.g., solenoid) that receives a control signal from the controller 62 (or plural controllers) and responsively, actuates the control valve in known manner to enable a change in flow through the control valve and to the ports of the hydraulic cylinder 44. In response to the actuation, the hydraulic cylinder 44 (e.g., the extension of the rod of the rod-piston assembly) causes the coupled device (e.g., in the case of the actuable device 44, the angular bracket 46) to move, which causes the second portion 34 of the frame 20 to rotate about the pivot joint 36, resulting in an adjusted angular position. As indicated above, such an adjustment may be achieved in a variably continuous manner or in a discrete, incremental manner, depending on the actuator and/or the control algorithm of the conveyor control software 80. In some embodiments, the actuable device controls 68 may be embodied as electrical, pneumatic, mechanical actuators, in addition to or in lieu of hydraulic actuation, or in some embodiments, as switches (e.g., relays, contactors, etc.). In some embodiments, one or more of the actuable devices may be omitted in favor of manual (e.g., mechanical) levers or controls.

Note that the input at the user interfaces 66 may correspond to the operator engaging the crop conveyor system 12, including well-known functions of swiveling the frame 20 into an operable or engaged position, positioning the frame 20 up or down, engagement of the motor 48 to initiate movement of the conveying medium 30 and speed adjustment of the conveying medium 30), as well as functions of the disclosed embodiments (e.g., adjustment of the angle of the second portion 34 relative to the first portion 32 of the frame 20). In some embodiments, the operator input may include entry of the width of the header and/or crop type or field conditions. In some embodiments, the sensors 64 (e.g., contact type or non-contact type sensors) may provide the conveyor control software 80 with feedback (e.g., signals via I/O interfaces 72) regarding certain functions of the windrower 10, such as based on detection of the current angular position of the second portion 34 relative to the first portion 32, or the detected speed at which the conveying medium 30 moves across the plural rollers 54, 56 of the frame 20. In some embodiments, other sensor input may include the detected angular position of the wheels (e.g., detecting whether a turn for approaching a subsequent pass of the field is occurring to automatically lower (or raise) the crop conveyor system 12), or positioning and/or heading information (e.g., via global navigation satellite systems (GNSS), radar, laser, video, etc.) signal input to detect when the windrower 10 has reached an end of field pass to enable the raising or lowering of the crop conveyor system 12. In some embodiments, input entered by an operator may instead be received via a sensor (e.g., width of the header may be detected by a camera or video device).

The user interfaces 66 may comprise a display screen coupled to the controller 62 with selectable icons, a hydro handle or joystick with selectable buttons or switches, a console with switches, button, knobs, scroll wheel, a microphone, etc., with corresponding signals from operator input received at the user interfaces 66 delivered via the I/O interfaces 72 to the conveyor control software 80 executing on the processor 70. A lookup table (or other form of data structure in some embodiments) may be stored in memory 74 when used to translate the input (e.g., whether via user interfaces input or sensor input) to a corresponding function (e.g., changing the angular position between the first and second portions 32, 34 of the frame 20, changing the speed at which the conveying medium 30 moves, etc.). The output from the conveyor control software 80 is provided to the actuable device controls 68, which in turn causes the actuable devices (e.g., 44 and 48) to effectuate movement of structural components of or associated with the crop conveyor system 12.

In some embodiments, the sensors 64 provide input regarding parameters of the mowed crop, such as moisture content, density, etc. to enable automatic or semi-automatic (e.g., with some operator intervention) adjustment of settings of the crop conveyor system 12, such as angular adjustment, speed, etc., to ensure uniform and/or untangled windrow formation.

Execution of the conveyor control software 80 may be implemented by the processor 70 under the management and/or control of the operating system 78. For instance, as is known, the source statements that embody the method steps or algorithms of the conveyor control software 80 may be translated by one or more compilers of the operating system 78 to assembly language and then further translated to a corresponding machine code that the processor 70 executes to achieve the functionality of the conveyor control software 80. Variations of this execution process are known, depending on the programming language of the software. For instance, if Java-based, the compiled output may comprise bytecode that may be run on any computer system platform for which a Java virtual machine or bytecode interpreter is provided to convert the bytecode into instructions that can be executed by the processor 70. Also, register transfer language (or other hardware description language) may be used to translate source code to assembly language, which the one or more operating system compilers translate to executable machine code. In some embodiments, the operating system 78 may be omitted and a more rudimentary manner of control implemented. The processor 70 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 62.

The I/O interfaces 72 provide one or more interfaces to one or more devices, such as the actuable device controls 68, the user interfaces 66, the sensors 64, among other devices that are coupled directly or indirectly (e.g., over a bus network, such as a CAN network, including one operating according to ISO-bus) to the controller 62. The I/O interfaces 72 may also comprise functionality to connect to other networks. For instance, the I/O interfaces 72 may include a network interface that enables remote or wireless communications, such as via well-known telemetry functionality, Blue-tooth communications, near-field, among other electromagnetic spectrum communications.

When certain embodiments of the controller 62 are implemented at least in part with software (including firmware), as depicted in FIG. 7, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 62 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
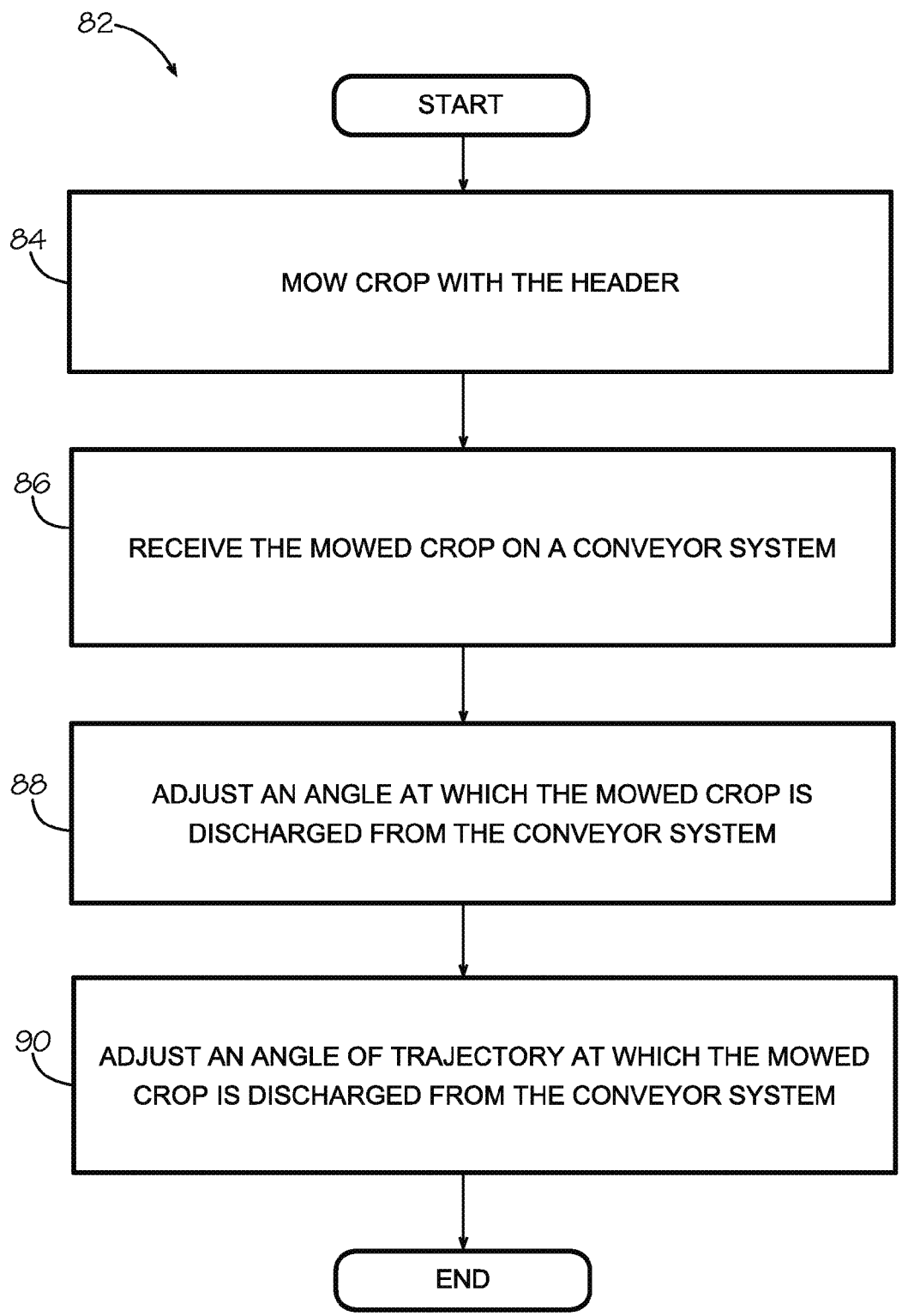
FIG. 8 is a flow diagram that illustrates an embodiment of an example method of operating a windrower using a crop conveyor system.

Having described some example embodiments of a crop conveyor system 12, it should be appreciated in view of the present disclosure that one embodiment of a method of operating a windrower using a crop conveyor system, the method depicted in FIG. 8 and denoted as method 82, comprises mowing crop with the header (84); receiving the mowed crop on a conveyor system (86); adjusting a rate at which the mowed crop is discharged from the conveyor system (88); and adjusting an angle of trajectory at which the mowed crop is discharged from the conveyor system (90).

Any process descriptions or blocks in flow charts should be understood as representing steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method of operating a windrower with a header coupled thereto, the method comprising:

mowing crop with a header configured to harvest crop material as the windrower advances along a field and discharge the harvested crop in a rearwardly directed stream;

receiving the mowed crop on a conveyor system having a frame coupled to a chassis of the windrower and a moving conveying medium, the frame comprising a first section and a second section with a pivot joint in between said first and second sections, wherein at least one roller is coupled to the first section and at least one roller is coupled to the second section for movement of the conveying medium relative the frame;

moving the frame relative the chassis with a structural assembly between a non-operational, raised position in which the stream of crop material is directed onto the ground under the conveying medium and an operational, lowered position in which the crop material is received onto the conveying medium which directs the crop material to a side of the windrower to form a windrow on the ground to the side of the windrower; and adjusting an angle of trajectory at which the mowed crop is discharged from the conveyor system with an actuable device by moving the second section relative to the first section about the pivot joint, such that the first section of the conveying medium is oriented at an angle different than an angle of the second section of the conveying medium, wherein in the operational position and with the frame selected to one of the predetermined angular adjustments, the conveying medium discharges the harvested crop material at an angle of trajectory determined by the selected angular positon of the second portion such that the angle of trajectory of crop material leaving the conveying medium relative the ground is different than an angle of movement of crop material on the first section of the conveying medium relative the ground.

2. The method of claim 1 further comprising adjusting a rate at which the mowed crop is discharged from the conveyor system by adjusting the speed that the conveying medium moves relative the frame.

3. The method of claim 1, wherein adjusting the angle of trajectory comprises adjusting an angle formed between the first and second sections.

* * * * *